Figure 1C:
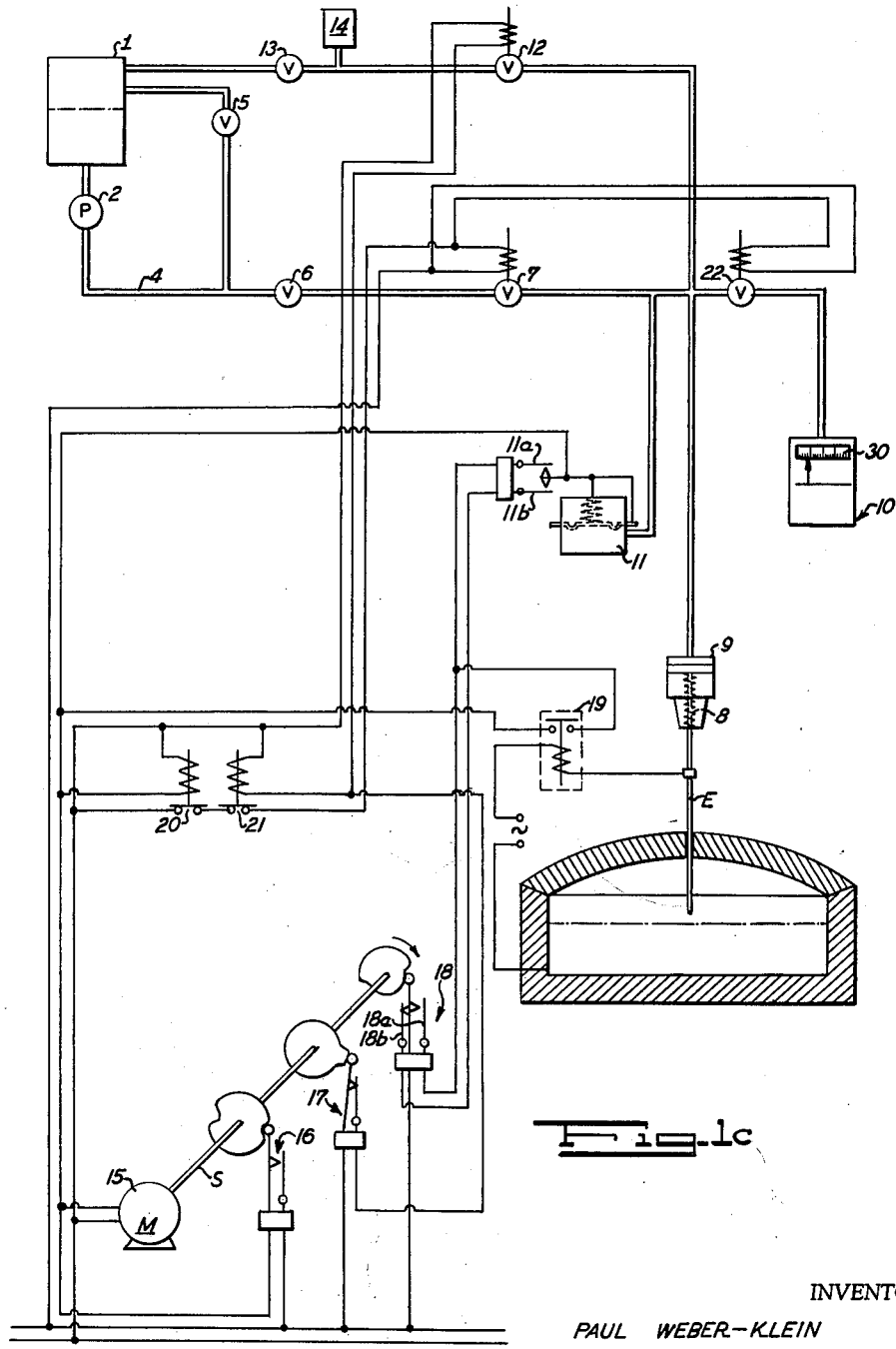

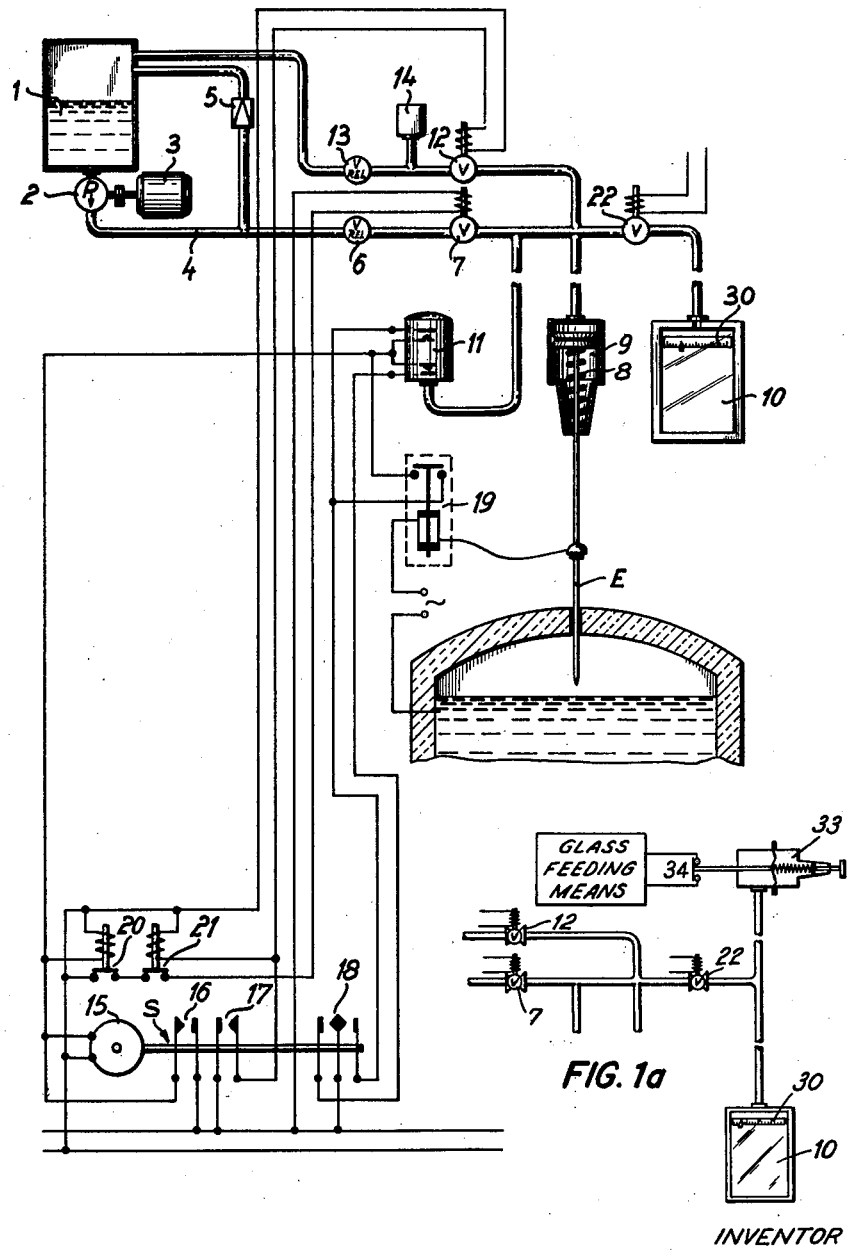

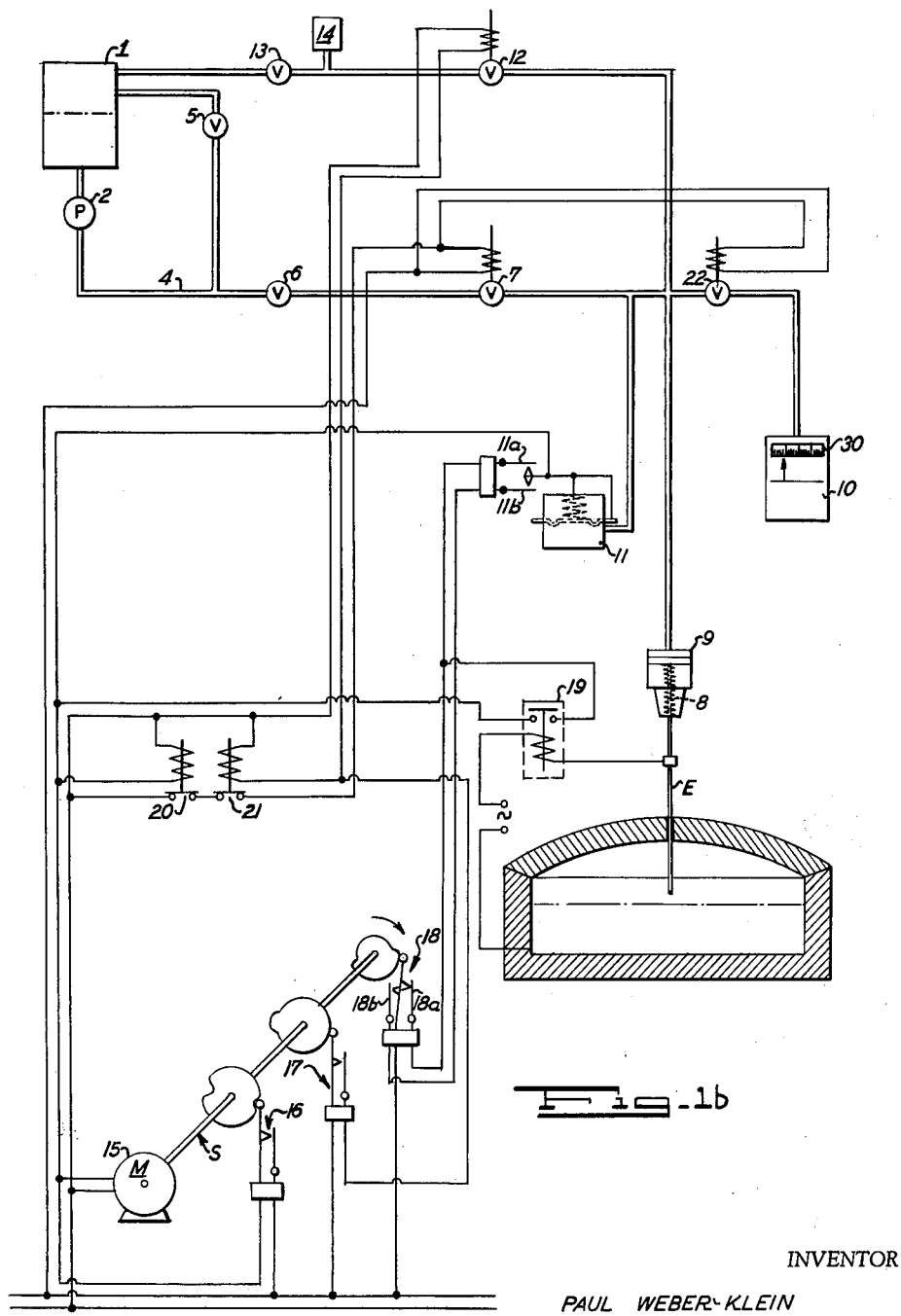

March 31, 1964 P. WEBER-KLEIN 3,126,741
APPARATUS FOR INDICATING AND PERMITTING THE REGULATION
OF THE LEVEL OF MOLTEN GLASS IN MELTING TANKS
Filed Aug. 21, 1959 4 Sheets-Sheet 3

INVENTOR
PAUL WEBER-KLEIN

BY
ATTORNEY

United States Patent Office 3,126,741
Patented Mar. 31, 1964

3,126,741
APPARATUS FOR INDICATING AND PERMITTING THE REGULATION OF THE LEVEL OF MOLTEN GLASS IN MELTING TANKS
Paul Weber-Klein, Mainz, Germany, assignor to Jenaer Glaswerk Schott & Gen., Mainz, Germany, a corporation of Germany
Filed Aug. 21, 1959, Ser. No. 835,202
Claims priority, application Germany Aug. 26, 1958
15 Claims. (Cl. 73—290)

The present invention relates to an apparatus for indicating and permitting the regulation of the height of the level of molten glass in melting tanks.

It has been found expedient in the conventional machine production of articles of glass to make sure that all factors which might otherwise exert an adverse influence on the glass product be maintained constant as far as possible. One of these factors is the level of the glass in the melting tank from which the molten glass is charged to the shaping machines. Variations in the level of the glass have the result that the glass shaping machines are not charged with glass uniformly. Thus, for instance, during feed operations, differences in the weight of the drops of glass charged to the machines occur as a consequence of which the glass mold may be either insufficiently filled or the formed walls of the glass product may be too thick.

Moreover, it is of considerable importance also to maintain the glass level constant for the melting process generally and for the life of the tank itself since melting tanks, as is well known, are exposed to the greatest corrosion at the float line. In order to maintain the glass level constant, it is first of all necessary that this level be constantly sensed or recorded.

For this purpose, various methods and apparatus have been developed. Most operate in part pneumatically by means of nozzles, the emergent air pressure from which depends on and hence measures the distance away of the surface of the glass, or else they utilize radioactive preparations, the radiation of which is weakened to a greater or lesser extent by the attendant presence of the surface of the glass. These known methods, however, do not provide the required accuracy and are very difficult to calibrate. Furthermore, the sensitive drive and control parts therefor unfortunately must generally be set up in the vicinity of strongly heat radiating furnace parts.

An electric method for recording the molten glass level has been found advantageous in which the conductivity of the glass at high temperatures is utilized. In this case, the surface of the glass is sensed at regular intervals by a platinum electrode. The platinum electrode is, in this known method, moved up and down by a motor into and out of contact with the surface of the glass. When the descending electrode contacts the surface of the glass, it is stopped and its position transmitted by a bridge circuit to an indicating instrument. Thereupon, the electrode again moves up until the thread of glass which forms is broken off. The interruption of the electrode and glass circuit which takes place upon removing the electrode from contact with the glass, causes the reversal of the direction of rotation of the motor, so that the electrode again moves downward and the cycle is repeated.

However, it has been found that even in this known method relatively high expense for sensitive switch and control parts is involved.

It is an object of the present invention to overcome the foregoing disadvantages and to provide a simple apparatus of increased dependability in operation for indicating and permitting the regulation of the molten glass level in glass melting tanks.

Other and further objects will become apparent from a study of the within specification and accompanying drawings in which:

FIG. 1 is a diagrammatic view of an indicating apparatus which serves to permit regulation of the molten glass level in a glass melting tank in accordance with one embodiment of the invention; and FIG. 1a is a partial view of an embodiment similar to that shown in FIG. 1, including means for controlling the feeding of the glass;

FIGS. 1b and 1c represent schematic views corresponding to FIG. 1 which show in greater detail the motor driven contact switch having a shaft with appropriate cams for closing the contacts 16, 17, and 18, which are normally biased toward the cams, as well as sub-circuit means for operating certain relay and solenoid means.

Figure 2:
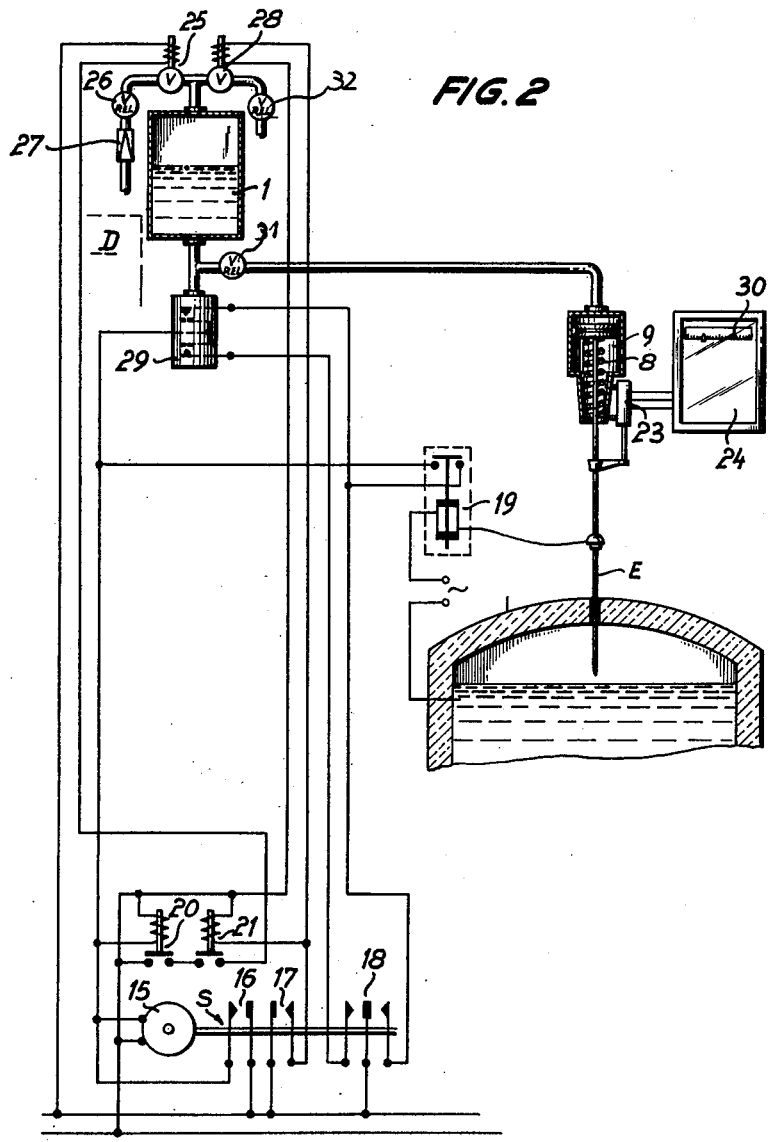

FIG. 2 is a similar view of a further embodiment of the invention.

In accordance with the invention, an apparatus for indicating and permitting the regulation of the level of the glass in melting tanks is provided in which an electrode, which moves up and down so as to dip into and out of the molten glass, closes and opens a relay circuit for the actuation or control of the indicating device. This device in turn is adapted to permit the glass feed to take place up to the desired level. The electrode, for example, is attached to a piston rod of a piston cylinder arrangement wherein the piston is actuated hydraulically or pneumatically in the cylinder against the counter pressure of a spring so as to move the electrode into and out of contact with the glass surface.

Referring to FIGS. 1, 1b and 1c, hydraulic oil or other suitable medium is removed from the storage tank 1 by a pump 2 which is driven by a motor 3. This medium is forced into the conduit 4. A pressure regulator 5 maintains the pressure in the system at an adjustable amount, preferably 1 atmosphere gauge. An accurate adjustment valve 6 regulates the rate of oil flowing to the cylinder 9, whereby the speed of travel of the electrode E towards the surface of the glass can be varied within wide limits. The solenoid valve 7 is opened by the operation of switch S upon completion of the emersion cycle of the electrode from the molten glass.

Since the oil pressure, aside from the determinable factors of the constant weight of the moving parts and the constant friction in the cylinder, depends only on the counter force of the spring 8 in the cylinder 9, the pressure indicated on an indicator device 10 provided with a suitable scale 30, constitutes a linear measurement of the path of the electrode. The pressure reached, when the electrode comes into contact with the glass, therefore corresponds to a given level of the glass. The pressure indicator 10, the operating range of which can be chosen, in accordance with the standardized transmitter output pressure, within the limits of 0.2 to 1 atmosphere gauge, therefore is conveniently provided with a scale which is calibrated in millimeters of glass level.

If the level of the glass has dropped a distance greater than that corresponding to the maximum downward stroke of the electrode E, the pressure switch 11 is actuated to close at contact 11a (see FIGS. 1b and 1c) by the pressure generated in moving the piston against the action of spring 8, and the closing of the solenoid valve 7 is effected. The closing of the valve 7 is otherwise effected by contact of electrode E with the glass. Upon closing of valve 7 in either case, the reversing of the switch S is simultaneously carried out. The switch S is so designed that it holds the solenoid valve 7 in closed position for about 3 seconds.

During this period of time, the electrode E and the pointer of the pressure indicator 10 are at a standstill. The level of the glass can now be determined, for regulating purposes, such as by means of a conventional pressure switch regulator 33 (see FIG. 1a). In this way, there is furthermore avoided the possibility of error in the measurement of the pressure caused by variable resistances to flow.

After expiration of this period of time, the solenoid valve 7 remains closed, while the solenoid valve 12 is opened so that the spring 8 may force the oil back into the storage vessel 1 via the fine-adjustment valve 13. Valve 13 determines the speed of the upward movement of the piston. Between the solenoid valve 12 and the regulating valve 13, there is preferably provided a small air chamber 14, which upon the opening of the solenoid valve 12 produces, via an air cushion, a sudden drop in pressure. As a result, the electrode E is raised abruptly from the glass so as to cause any clinging threads of glass extending to the surface of the glass to break off.

When the pressure at the pressure switch 11 drops below an adjustable predetermined value which corresponds to a given height of withdrawal of the electrode E from the glass, switch 11 is actuated to close at contact 11b (see FIGS. 1b and 1c), so that switch S is again reversed. Consequently, the solenoid valve 12 closes, while the solenoid valve 7 opens, and the scanning or sensing process is repeated.

The particular manner of operation of the electric switching arrangement is as follows: The switch S is a motor-driven contact switch which, after the stopping of current for the switch motor 15, passing through either of the sub-circuits of switch 18 at the left-hand or the right-hand contact, for example, continues half a revolution in four seconds by means of the holding contact 16 which continues to supply current to motor 15 through an alternate sub-circuit for achieving said half revolution of switch S. Motor 15 and switch S then remain stopped until next energized. If the electrode E now contacts the surface of the glass, one circuit through the glass is closed (which may be energized, for example, by a separate current source) in the conventional manner so that in turn electronic relay 19 is closed which is connected in parallel to the pressure switch 11 in a further circuit. A current flows thereby from the reversing switch 18 which at this moment due to the previous half revolution of switch S rests against the righthand contact 18a (see FIG. 1b), via the electronic relay 19 to the switch motor 15, and at the same time to the rest-contact relay 20 which thus breaks the circuit to the coil of solenoid valve 7 so that this valve immediately closes upon contact of the electrode with the glass. The electrode E therefore comes to a stop since the supply of fluid via valve 7 to the control cylinder piston arrangement is cut off. At this point, for instance due to the flow of current through the circuit of contact 18a (see FIG. 1b) and then through the circuit of holding contact 16, motor 15 completes a half revolution to shift the change-over contact 18 to the left hand contact 18b (see FIG. 1C) in ready position for the bottom reversal switch contact point 11b of the pressure switch 11.

The circuit of contact 17 is closed shortly before the opening of the holding contact 16. The opening of holding contact 16, as aforesaid, causes the switch motor 15 of the control switch S to come to a stop after four seconds and also deenergizes the coil of relay 20, permitting the relay 20 to drop back into rest position, at first glance, so as to close the circuit for and thus open valve 7. The closing of contact 17, however, not only closes the circuit for the coil of and thus causes the opening of the solenoid valve 12, but at the same time actually continues to hold the circuit to the coil of solenoid valve 7 open by energizing the holding current relay 21. Valve 7 is thereby kept closed even though relay 20 is in rest position. The oil can now discharge from the cylinder 9 through the solenoid valve 12 into the storage container 1, whereby the pressure drops below the predetermined pressure level of pressure switch 11. This switch 11, after such pressure drop, connects through the circuit including contact 11b (see FIG. 1c) the switch S via the reversing contact 18 through the circuit including contact 18b with motor 15, which switch now opens contact 17 whereby the circuit to the holding current relay 21 and the coil of valve 12 (in parallel) is broken and the solenoid valve 12 is closed. In turn, after the current through contact 18b is cut off as motor 15 operates switch S and the current next passes to motor 15 through the circuit of contact 16, switch S causes holding contact 16 to open, and the motor and switch to remain stationary. The circuit to the coil of holding current relay 20 is thus broken so that the relay closes the circuit energizing the coil of solenoid valve 7, whereby valve 7 opens and the process is repeated.

It will be appreciated more clearly from FIGS. 1b and 1c that motor 15 may be energized to actuate switch S when the circuit, including either contact 16 or 18, is closed since these circuits both include motor 15. Thus, upon contact of the electrode E with the glass, electronic relay 19 closes the circuit through contact 18 and motor 15 whereupon motor 15 will actuate switch S. The circuit through relay 19 and the glass is the well known circuit conventionally used in the art. Upon such actuation switch S will close the circuit through contact 16 while contact 18 will reverse thereby breaking the circuit through contact 18 and relay 19. Motor 15 will continue to energize the switch S for four seconds through the circuit including contact 16 since contact 16 is a holding contact. During this period when the circuit through contact 16 is closed, motor 15 will actuate switch S to close the circuit through contact 17 (see FIG. 1c) and immediately thereafter holding contact 16 will open, deenergizing motor 15. Since current will continue to flow through contact 17, the emptying of the cylinder may be carried out for raising the electrode E until pressure switch 11 closes the circuit, including contact 18 (now reversed) and motor 15, whereby switch S will once more be energized. Contact 17 will thus be opened so that current no longer will flow through the circuit to the coils of valve 12 and relay 21. Although relay 21 would otherwise close the circuit including the coil of valve 7, because the circuit including contact 18 at this point has motor 15 connected in parallel with relay 20, the circuit for valve 7 will remain open.

During this time the flow of pressure medium from the cylinder will be stopped since contact 17 is open and the flow through valve 7 will be prevented since relay 20 remains energized. As motor 15 continues to actuate switch S, the circuit to contact 18 will be opened in the same way as described above with contact 18 being reversed once more for connection with relay 19, while the circuit through contact 16 will be closed. Upon closing the circuit including contact 16, relay 20 will remain energized even though the circuit through contact 18 is broken. Since contact 16 is a four-second holding contact only, after the end of the four seconds contact 16 will open, de-energizing relay 20 so that current will now flow through the circuit of valve 7 and allow the normal flow of pressure medium into the cylinder to cause the lowering of the electrode E once more. Of course, if desired, by suitable arrangement the contact 18 may merely be closed by the action of motor 15 and switch S so that relay 20 will be de-energized, permitting the flow of medium through valve 7, since the need for closing the circuit through contact 16 at this point is not critical.

It will be appreciated that while motor 15 may be placed in circuit with either contact 18 or contact 16, the same may not be placed in circuit with contact 17. This is true since contact 16 is a holding contact whereas contact 17 is merely energized by switch S until the circuit through contact 17 is broken. The latter occurs when pressure switch 11 closes the circuit through contact 18, permitting motor 15 to actuate switch S to open the contact 17.

Concerning the operation of pressure switch 11, the same may be considered a double contact pressure switch in which is disposed a pressure sensitive diaphragm movable from a low pressure position to a neutral position and thence to a high pressure position, depending upon the particular pressure present in the pressure lines connected to said switch. Such switches are well known in the art and are used for responding to predetermined high pressure and low pressure levels. Neither the high pressure nor the low pressure contacts of switch 11 need be closed at all times since switch 11 is generally designed to operate only when the electrode E is withdrawn from the molten glass tank a predetermined distance. This distance is directly translated into low pressure since the compressive spring 8 is able to force the electrode E in upward direction against the pressure within the pressure lines. Upon reaching a predetermined low pressure, the low pressure contact of switch 11 closes the circuit through contact 18 so that motor 15 will actuate switch S in the desired manner. Normally switch 11 will not otherwise be closed since relay 19 will close the circuit through contact 18 when the electrode E touches the glass surface. However, where there is insufficient glass in the tank, or for such other reason as may be determinative, if an unduly high pressure is present within the system such that the electrode E will be forced downwardly too far and still not touch the glass surface so as to energize relay 19, of course, then the high pressure contact of switch 11 will close the circuit through contact 18 and motor 15, etc. It will be appreciated that contact 18 automatically reverses so as to accommodate during any one phase of operation the proper circuit through either relay 19 or switch 11.

In certain cases, the hydraulic indication of the level of the glass in terms of the pressure of the oil on the piston and against the return spring 8 can be erroneous. Thus, for instance, if variable friction is present with respect to the rods which must be used to suspend the electrode or if the electrode becomes lighter during the course of time, due to the melting away of the ceramic protective tube, sources of error will be present. Furthermore, if the distance of the measuring and indication instruments from the electrode with its actuating device is very large so that the hydraulic transmission will be unfavorable, a further source of error is introduced.

In these cases, it is possible in a simple manner to provide on the piston rod used for the upward and downward displacement of the electrode an electric servomotor 23 (see FIG. 2) which is connected to one or more indicators 24. The indication sought is then entirely independent of the process carried out in the hydraulic system while the advantages of this type of actuation are retained in full. The connection of suitable feed lines to the servomotor is all that is required.

Although oil pumps and electric motors require substantially no maintenance and are dependable in operation, it may be desired to operate the apparatus of the invention without moving parts such as by use of compressed air. FIG. 2 shows such an arrangement in which, for the production of the oil pressure, there is provided a pressure tank D which is placed under air pressure of preferably one atmosphere gauge via the solenoid valve 25, corresponding in operation to valve 7 of FIG. 1, the fine adjustment valve 26, corresponding in operation to valve 6 of FIG. 1, and the pressure regulator 27. Upon the opening of the solenoid valve 25, the piston is moved with the electrode E towards the glass. The process via the control mechanism circuit takes place in the manner described above for FIG. 1. The return flow of the oil into the storage tank D is effected via valve 32 corresponding in operation to valve 13 of FIG. 1 by the opening of the solenoid valve 28 corresponding in operation to valve 12 of FIG. 1, with the simultaneous closing of the valve 25, whereby the air can escape from the vessel into the atmosphere. The control pressure switch 29 corresponding in operation to switch 11 of FIG. 1 is arranged in pressure communication with the tank D. Valve 31 regulates the rate of fluid flow to and from cylinder 9. It will be appreciated, of course, that compressed air alone, without any oil, may be used as pressure transmission agent.

If there is optionally provided in the conduit to the indicating devices a solenoid valve 22 (see FIGS. 1c and 1d) which is kept open by the same control mechanism or some other suitable relay means, i.e. for example by connecting the solenoid thereof in the circuit to the solenoid of valve 7, until the piston, after the electrode has contacted the glass, is at rest, the measuring mechanism will advantageously remain at the glass level last indicated. The level of the glass can therefore be read at any time until the valve 22 is once more opened for a new determination. Also, the gentlest possible treatment of the sensitive measurement mechanisms is made possible since they are protected from the continuous action of the periodically varying pressures and only in communication with the fluid system when the electrode is being moved downwardly and not when the electrode is moving upwardly.

Instead of a cylinder and piston arrangement requiring suitable sealing or packing, there can be used, in order to avoid objectionable frictional forces, preferably a spring bellows which is acted upon by internal or external fluid pressure, or a spring-loaded diaphragm, such as is used, for instance, in pneumatic valves.

In order to ensure that the pressure during the indicating process will remain constant, it is advisable to provide a further air chamber in the conduit between the electrode actuating member and the pressure indicator device.

As shown in FIG. 1a, by the use of an adjustable pressure switch 33 in the pressure line to the pressure or glass-level indicator in accordance with the invention, it is possible to effect conveniently the regulation of the level of the glass. In this regard, the pressure switch 33, upon exceeding an adjustable pressure which corresponds to a given glass level, closes a contact relay 34 which in turn may be used to operate a conventional electrically controlled glass feeding machine 35 by automatically controlling the electrical circuit of such feeding machine. If the pre-set pressure is no longer reached upon subsequent contacts of the electrode with the glass as a result of an increase in the level of the glass, such contact opens and stops the operation of the feeding machine. Instead of a pressure switch, a contact monometer or a similar device may also be used.

Thus, a conventional pressure switch 33, which senses predetermined high pressure (too much filling of the cylinder and too low a movement of electrode contact into the tank) may be placed in the pressure line leading to indicator 10 so that upon reaching a predetermined pressure in the pressure line, the glass feeding will automatically take place by actuation of the feeding machine in dependence upon pressure switch 33 and the coacting relay 34.

The entire apparatus may be constructed of conventional elements in the particular relation in accordance with the invention. The apparatus can be arranged therefore in a compact space at a suitable location in the vicinity of the melting tank, the glass level of which is to be measured. The cylinder is suitably positioned with the suspended electrode slidably received through the glass-level measuring hole in the melting tank cover.

What is claimed is:

1. An arrangement for indicating the height of the level of molten glass being fed into a melting tank which comprises an electrode movable into and out of contact with the surface of molten glass in a melting tank, circuit means including said glass and said electrode, one circuit of said circuit means being closed upon contact of said electrode with the surface of said glass, means including pressure means for moving said electrode into and out of contact with the surface of said glass, and pressure responsive indicator means responsive to movement of said electrode for indicating the level of the glass in said tank upon the closing of said one circuit of said circuit means.

2. An arrangement according to claim 1 wherein said means for moving said electrode includes a piston-cylinder arrangement.

3. An arrangement according to claim 2 wherein the electrode is positioned for movement together with the piston of said arrangement, said piston being actuated in one direction in the cylinder of said arrangement by a fluid pressure medium and in the opposite direction by a compression spring.

4. An arrangement according to claim 3 wherein a servomotor responsive to movement of said electrode is positioned on said piston-cylinder arrangement, said servomotor being connected to said indicator means responsive to movement of said electrode for indicating the level of the glass.

5. An arrangement according to claim 1 wherein the pressure responsive indicator means is provided with linear calibrations whereby the pressure is indicated in terms of the level of the glass in said tank.

6. An arrangement according to claim 1 wherein means are included for stopping the forward movement of said electrode upon contact with the surface of said glass and for reversing the movement of said electrode after a predetermined interval, said means being further provided with regulating means capable of stopping the forward movement of said electrode after a predetermined length of travel and of reversing the movement of said electrode even if said electrode does not contact the surface of said glass.

7. An arrangement according to claim 1 wherein said means for moving said electrode include a cylinder, a piston movable in said cylinder in one direction by the action of a compression spring and in the other direction by the action of a fluid pressure medium, said electrode is connected for movement together with said piston, valve means are provided for controlling the flow of pressure medium to and from said cylinder, and said means responsive to movement of said electrode are in pressure communication with said pressure medium and are pressure responsive thereto, said means responsive to movement of said electrode including means for indicating the level of said glass.

8. An arrangement according to claim 7 wherein said valve means are electrically operated and include a first valve means being connected for permitting fluid pressure medium to flow into said cylinder, said first valve means being controlled by first valve relay means situated in a first further circuit of said circuit means, and a second valve means being connected for permitting fluid pressure medium to flow from said cylinder, said second valve means being controlled by control switch means situated in said first further circuit of said circuit means, said first valve relay means closing said first valve means upon first actuation of said control switch means to open said second valve means, said circuit means further including an electrode relay actuated by closing said one circuit upon contact of said electrode with the surface of said glass and a further first valve relay means, said electrode relay and said further first valve relay means being situated in a second further circuit with said control switch means so that upon actuation of said electrode relay said second further circuit with said control switch means becomes closed whereupon second actuation of said control switch means actuates said further first valve relay means to stop the flow of pressure medium into said cylinder and opens said first circuit to stop the flow of pressure medium from said cylinder.

9. An arrangement according to claim 8 wherein a pressure responsive switch in pressure communication with said pressure medium is arranged in parallel with said electrode relay in said second circuit, said pressure responsive switch closing said second circuit with said control switch means upon its actuation when a predetermined pressure has been reached by said pressure medium flowing into said cylinder whereby said further first valve relay means stops the flow of pressure medium into said cylinder.

10. An arrangement according to claim 9 wherein said control switch means is arranged for additionally opening said first circuit upon actuation of said pressure responsive switch when a second predetermined pressure has been reached by said pressure medium flowing from said cylinder whereby said second valve means stops the flow of pressure medium from said cylinder.

11. An arrangement according to claim 7 wherein said valve means are electrically operated and include normally open inlet means being connected for permitting fluid pressure medium to flow into said cylinder and normally closed outlet means being connected for permitting fluid pressure medium to flow from said cylinder, said inlet means being closable separately by one relay means situated in a further circuit of said circuit means together with control switch means and an electrode relay, said electrode relay being actuated by closing said one circuit upon contact of said electrode with the surface of said glass, and by other relay means situated in a still further circuit of said circuit means together with said control switch means, said outlet means being openable by said control switch means in said still further circuit, so that upon actuation of said electrode relay by contact of said electrode with said glass, said control switch means separately first actuates said one relay means in said further circuit to close said inlet means and stop the flow of pressure medium into said cylinder and thereafter actuates in said still further circuit both said outlet means to permit the flow of pressure medium from said cylinder and said other relay means to keep said inlet means closed until a predetermined amount of fluid pressure medium flows from said cylinder whereupon said outlet means and said other relay means are deactuated to permit the opening of said inlet means and the repeating of the cycle.

12. An arrangement according to claim 11 wherein a pressure responsive switch in pressure communication with said pressure medium is arranged in parallel with said electrode relay in said further circuit, said pressure responsive switch closing said further circuit with said control switch means upon its actuation when a predetermined pressure has been reached by said pressure medium flowing into said cylinder whereby said one relay means stops the flow of pressure medium into said cylinder.

13. An arrangement according to claim 12 wherein said control switch means is arranged for additionally opening said still further circuit upon actuation of said pressure responsive switch when a second predetermined pressure has been reached by said pressure medium flowing from said cylinder whereby said outlet means stops the flow of pressure medium from said cylinder.

14. An arrangement according to claim 1 wherein pressure responsive actuation means responsive to movement of said electrode are provided, said means being actuated upon the reaching of a predetermined pressure corresponding to a given movement of said electrode and adapted for actuating in turn a glass feeding device in connection with which the arrangement is used.

15. An arrangement according to claim 1 wherein a pressure responsive switch in pressure communication with said pressure means is provided, whereby in response to a given pressure, said switch is actuated, said switch being adapted for actuation in turn of a glass feeding device in connection with which the arrangement is used, for adjusting the level of glass in said tank.

References Cited in the file of this patent

UNITED STATES PATENTS

| | | |
|---|---|---|
| 2,565,136 | Kretzmer | Aug. 21, 1951 |
| 2,621,808 | Blakeney | Dec. 16, 1952 |
| 2,698,539 | Gridel | Jan. 4, 1955 |